(12) United States Patent
Wu et al.

(10) Patent No.: US 10,148,489 B2
(45) Date of Patent: Dec. 4, 2018

(54) SERVICE IMPACT EVENT ANALYZER FOR CLOUD SDN SERVICE ASSURANCE

(71) Applicant: AT&T Intellectual Property I, L.P., Atlanta, GA (US)

(72) Inventors: Tsong-Ho Wu, Englishtown, NJ (US); Wen-Jui Li, Bridgewater, NJ (US); Shyhyann Lee, East Brunswick, NJ (US); Li-Chuan Sun, Holmdel, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 312 days.

(21) Appl. No.: 14/841,766

(22) Filed: Sep. 1, 2015

(65) Prior Publication Data
US 2017/0063599 A1  Mar. 2, 2017

(51) Int. Cl.
*H04L 12/24* (2006.01)

(52) U.S. Cl.
CPC .......... *H04L 41/064* (2013.01); *H04L 41/065* (2013.01); *H04L 41/0686* (2013.01); *H04L 41/5035* (2013.01); *H04L 41/00* (2013.01)

(58) Field of Classification Search
None
See application file for complete search history.

(56) References Cited

U.S. PATENT DOCUMENTS

| 5,327,349 A * | 7/1994 | Hoste | G05B 19/41875 700/110 |
|---|---|---|---|
| 7,130,779 B2 | 10/2006 | Beverina et al. | |
| 7,278,163 B2 | 10/2007 | Banzhof et al. | |
| 8,028,066 B2 | 9/2011 | Lewis | |
| 8,261,353 B2 | 9/2012 | Hirsave et al. | |
| 8,505,210 B2 | 8/2013 | Cannings et al. | |
| 8,713,684 B2 | 4/2014 | Bettini et al. | |
| 8,763,071 B2 | 6/2014 | Sinha et al. | |
| 8,776,018 B2 | 7/2014 | Kumar et al. | |
| 8,856,300 B2 | 10/2014 | de los Reyes et al. | |
| 8,856,863 B2 | 10/2014 | Lang et al. | |

(Continued)

FOREIGN PATENT DOCUMENTS

| GB | 2521749 A | 1/2015 |
|---|---|---|
| WO | 2015038040 A1 | 3/2015 |

OTHER PUBLICATIONS

Fitó, Josep Oriol, Mario Macías Lloret, and Jordi Guitart Fernández. "Toward business-driven risk management for cloud computing." (2010) found on line at http://upcommons.upc.edu/e-prints/bitstreann/2117/14348/3/cnsm10.pdf.

(Continued)

*Primary Examiner* — Viet D Vu
*Assistant Examiner* — James A Edwards

(57) ABSTRACT

A service impact event analyzer is used to evaluate service assurance risk in cloud SDN networks. Using data fusion, an alarm subset dataset is generated from a raw trap dataset. Service impact events are identified in the subset dataset. The service impact events are categorized into service impacted event categories, and a model is created for associating the event categories with process function classes. Time durations of the service impact events are computed using correlated secondary alarms from the alarm subset dataset. The service assurance risk is evaluated using the model and the time duration.

20 Claims, 9 Drawing Sheets

(56) References Cited

U.S. PATENT DOCUMENTS

| | | |
|---|---|---|
| 8,856,936 B2 | 10/2014 | Datta Ray et al. |
| 8,918,881 B2 | 12/2014 | Bettini et al. |
| 9,049,235 B2 | 6/2015 | Liebmann et al. |
| 2006/0242467 A1* | 10/2006 | Dayen ............... G06F 11/008 714/38.11 |
| 2010/0218104 A1* | 8/2010 | Lewis ............... G06Q 10/04 715/736 |
| 2012/0010917 A1* | 1/2012 | De Godoi ............ G06Q 10/06 705/7.12 |
| 2012/0011077 A1 | 1/2012 | Bhagat |
| 2012/0311715 A1 | 12/2012 | Tal et al. |
| 2013/0097706 A1 | 4/2013 | Titonis et al. |
| 2013/0198840 A1 | 8/2013 | Drissi et al. |
| 2013/0339203 A1 | 12/2013 | Dias de Assuncao et al. |
| 2014/0047107 A1* | 2/2014 | Maturana ............. H04L 43/04 709/224 |
| 2014/0237545 A1 | 8/2014 | Mylavarapu et al. |
| 2014/0317257 A1 | 10/2014 | Zhang et al. |
| 2014/0336791 A1 | 11/2014 | Asenjo et al. |
| 2015/0154494 A1 | 6/2015 | Medvedovsky et al. |
| 2015/0189556 A1 | 7/2015 | Sindhu et al. |

OTHER PUBLICATIONS

Peiyu, L. I. U., and L. I. U. Dong. "The new risk assessment model for information system in cloud computing environment." Procedia Engineering 15 (2011): 3200-3204.

Fitó, J. Oriol, and Jordi Guitart. "Business-driven management of infrastructure-level risks in Cloud providers." Future Generation computer systems 32 (2014): 41-53.

Djemame, Karim, et al. "Legal issues in clouds: towards a risk inventory." Philosophical Transactions of the Royal Society of London A: Mathematical, Physical and Engineering Sciences 371.1983 (2013): 20120075.

* cited by examiner

SERVICE IMPACT EVENT ANALYZER FOR CLOUD SDN SERVICE ASSURANCE

TECHNICAL FIELD

Embodiments of the present disclosure relate to cloud service with software defined networking (SDN). Specifically, the disclosure evaluates the service impact risk of cloud SDN networks supporting service assurance.

BACKGROUND

Cloud-based software-defined networking (SDN) is a critical component of future communications networks. A cloud SDN network integrates user service requests and network resources in an automatic, on-demand manner through an integrated physical and virtual network infrastructure located in data centers and central offices. The on-demand automatic network resource allocation and reallocation in SDN is provided through a cloud closed control loop that links policy, event monitoring and analytics (EMA), resource orchestration and SDN controllers.

In the SDN closed control loop, the presently disclosed service impact event analyzer is part of an event monitoring and analytics (EMA) system that monitors network events via traps and determines whether these network events will cause risk of service assurance supporting the customer service level agreement (SLA). This capability allows EMA to provide critical feedbacks to a policy engine and resource orchestrator in the closed control loop to make necessary adjustments in order to meet SLAs. One important criterion for service assurance risk evaluation is whether the risk is service-impacting, and, if so, how long is the service impact. That criterion is important because cloud SDN networks use a service-centric network architecture model.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

Figure 1:
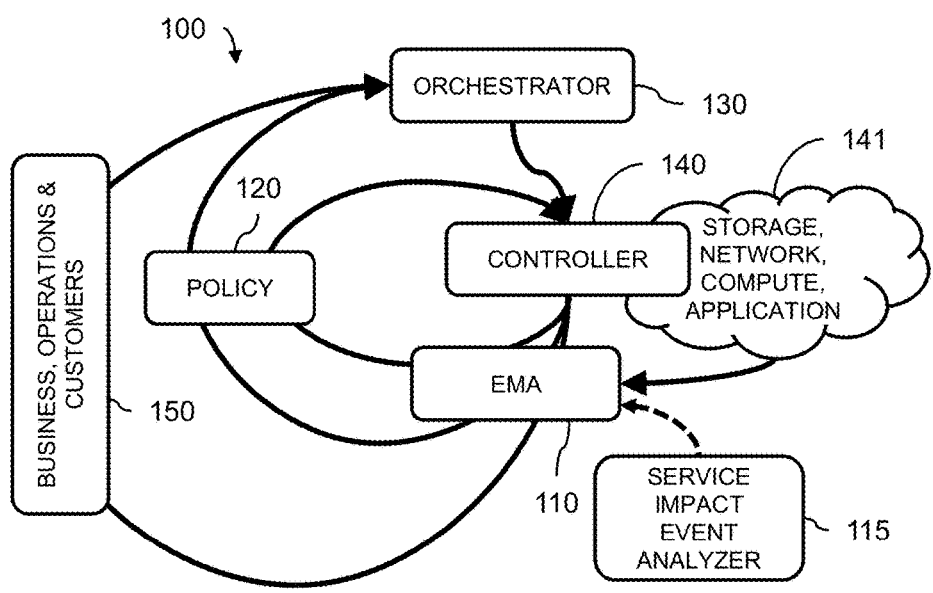
FIG. 1 is a block diagram showing functional relationships in a cloud SDN closed control loop.

In the present disclosure, an innovative event analyzer is proposed wherein fused alarm data is analyzed in an automated service assurance risk assessment module for evaluating whether alarms are service impacting and whether they have an impacting time duration to help policy and resource orchestration designs in a reliable cloud SDN closed control loop. The analyzer includes a data-driven general model having insights observed from monitored application-related alarm data from services test data. The analyzer can be used in any virtualized, physical or integrated virtual and physical networking and computing environment.

The event examples discussed below are from a VoLTE/IMS service, including both physical IMS and virtualized IMS. The monitored data differs between physical and virtual networks in terms of service impact analysis in that additional virtual machine (VM) and Guest OS traps must be observed for virtualized networks.

The presently disclosed service impact event analyzer provides critical feedback to the policy engine and resource orchestrator in the closed control loop to make necessary adjustments in order to meet SLAs. Thus, it can be used as a risk assessment tool for policy design and resource orchestration in a closed control loop of the cloud SDN network.

In addition to cloud resource orchestration and policy design risk management, other potential applications for the proposed disclosure include customer experience service impacted measurements and trending for customer care, and a scheduling decision support system for predictive maintenance.

Certain embodiments of the present disclosure are directed to method including several operations. Service impact events are identified in an alarm dataset from a cloud software defined network, the service impact events including service alarms. Alarm sources associated with the service impact events are also identified. Impacted network service alarms provided in the cloud software defined network are identified according to the alarm sources. Service alarm type classifications for the impacted network service alarms are also identified.

By a processor of a service impact event analyzer, a service impact model is identified, comprising the service alarm type classifications and the service impact events. The model describes impacts of the service impact events on network services. Using the service impact model, association rules of parent and child event relationships of the service impact events are identified, so that parent events are primary events for root causes of trouble, and child events are correlated to parent events. By the processor, time durations of the service impact events are computed using correlated secondary alarms, the correlated secondary alarms being identified using the service impact model. By the processor, a risk area and degree of service assurance are evaluated based on the time duration and on the service alarm type classifications.

The method may additionally include automatically tuning a cloud orchestration policy of the cloud software defined network based on the risk area and the degree of service assurance. The method may comprise automatically scheduling predictive maintenance operations of the cloud software defined network based on the risk area and the degree of service assurance.

In additional embodiments, a computer-readable storage device having stored thereon computer readable instructions is provided for evaluating a cloud orchestration policy in a network. Execution of the computer readable instructions by a processor causes the processor to perform operations comprising those described above with reference to the method.

In another embodiment, a service impact event analyzer is provided. The service impact event analyzer comprises a network interface for receiving raw trap data, a processor and a computer-readable storage device having stored thereon computer readable instructions, wherein execution of the computer readable instructions by the processor causes the processor to perform operations comprising those described above with reference to the method.

The respective features of the disclosure may be applied jointly or severally in any combination or sub combination by those skilled in the art.

Presently described is a service assurance risk analysis engine with a fault correlation information model that enables automated risk assessment for service assurance in the cloud SDN. The risk analysis engine avoids adding complex application layer performance monitoring. The risk analysis (1) determines whether received trap events have service impacts, and, if so, (2) determines the time duration and network areas of the service impact.

The presently disclosed risk analysis engine may be implemented in a closed control loop such as that used in the policy-driven cloud SDN network represented in the block diagram 100 of FIG. 1. Event monitoring and analytics (EMA) from an EMA element 110 is used in an orchestration policy 120. The policy 120 controls a resource orchestrator 130, such as for allocation and reallocation of resources. An SDN controller 140 executes resource allocation commands from the resource orchestrator 130. Those resource allocation commands result in the event monitoring and analytics 110, completing the closed control loop.

The presently disclosed data-driven fault correlation information model assesses service impact risks and impacted areas for cloud SDN service assurance management by analyzing traps received from network components. A "trap," as used herein, refers to an event trap. When a fault or event occurs, a network component sends a notification via its interface in the form of an event trap, such as a simple network management protocol (SNMP) trap or another format. An event alarm is a persistent indication of a fault that clears only when the triggering condition has been resolved.

The model first assesses whether service is impacted. If so, the model determines (1) how long (time) the service impact lasted, (2) which applications were impacted, (3) which devices carry the impacted applications and (4) the locations of the devices. To perform those tasks, the disclosed system includes three key system modules. First, an alarm data fusion module analyzes service impact. Second, a service impact event classifier performs a monitored, data driven, service alarm type classification, and creates a service impacting model to perform correlation and analytics and to determine whether received event traps from network components have service impacts. Third, a correlated service impact event time calculator models service impact event parent-child relationships and correlates and computes an event time interval.

Risk assessment in terms of service impacts is required to evaluate the effectiveness and risk of service assurance management, including new policy design and existing policy enhancement in a reliable closed control loop (policy/orchestration/controller/operations) in any policy-driven cloud SDN design and deployment.

The cloud SDN closed control loop architecture depicted by the block diagram 100 of FIG. 1 shows the integration of the presently disclosed service impact event analyzer 115. One skilled in the art will recognize that the analyzer of the present disclosure may be used with any number of closed control loop architectures, and that the cloud SDN-based closed control loop architecture is merely exemplary.

The orchestrator 130 may be requested to expand a service footprint, increase end-to-end bandwidth or move a service/network due to a planned or unforeseen outage or stress point. Controllers 140 manage their own execution environment within the scope of their domain 141. Orchestration is not involved in that level of change.

The EMA 110 receives events and data for analytics to make adjustments outside the domain 141 of the controller 140, or where policy 120 must be interrogated to determine appropriate action. Orchestration may be impacted depending on the scope of the analytics and/or event. The EMA 110 may determine that the event or analytics warrant the creation of additional resources in the resource layer or an additional order opportunity if, for example, thresholds are being approached with a customer 150 requested "notify me" prior to service expansion.

The service impact event analyzer 115 of the present disclosure may be integrated with the EMA 110.

Policy 120 is consulted when events occur to determine the breadth/depth of the action and the actor that must support that action. Policy may direct a request to the orchestrator 130 or controller 140 based on the scope of the resolution.

Figure 2:
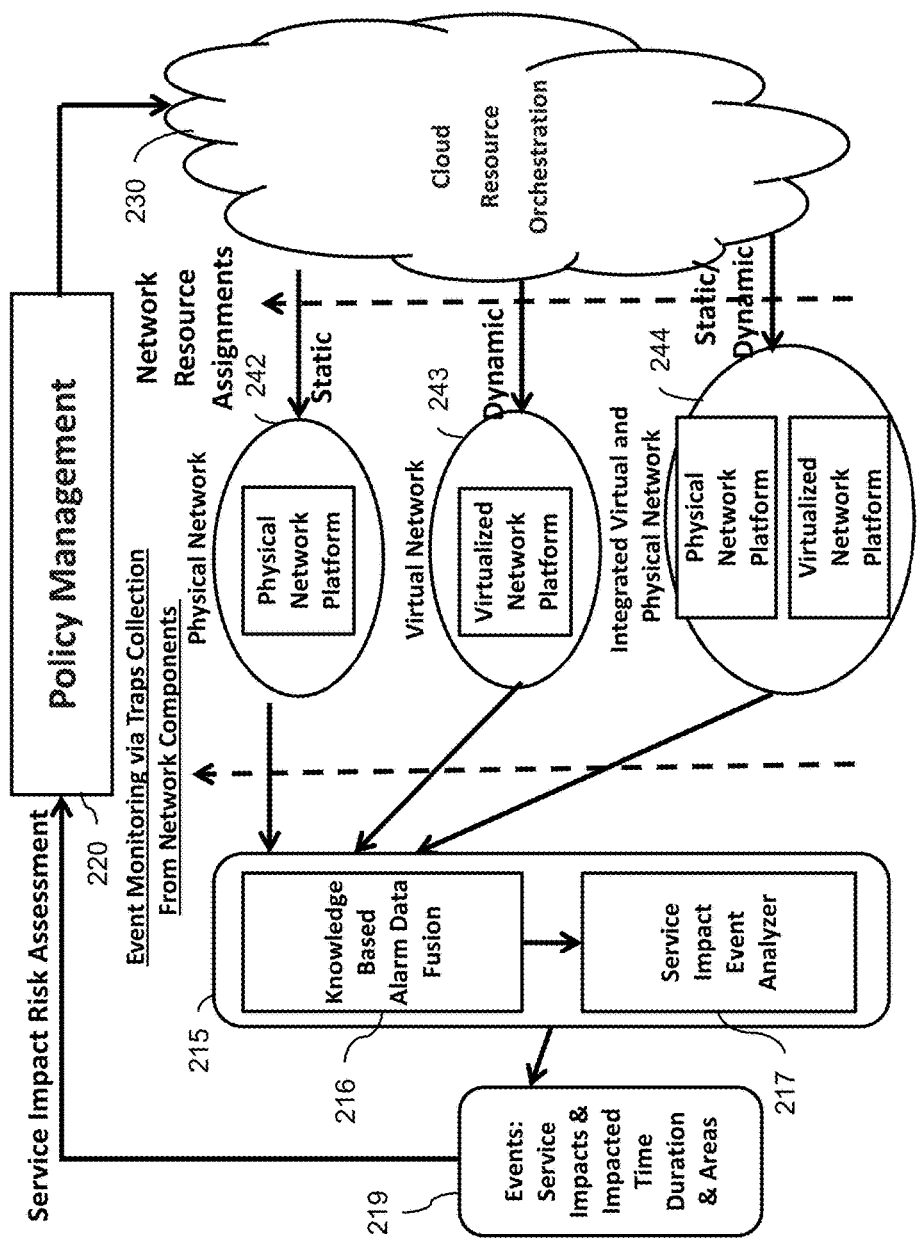
FIG. 2 is a flow chart showing a service impact event analyzer in an integrated virtual and physical network infrastructure according to embodiments of the present disclosure.

A service impact event analyzer 215 according to the present disclosure, shown in FIG. 2, monitors raw trap data from network components in one or more of a physical network 242, a virtual network 243 and an integrated virtual and physical network 244. The analyzer 215 performs a fusion process on the data using a data fusion module 216 to produce an alarm dataset. The alarm dataset is analyzed in a service impact event analyzer 217 to produce output events 219. The output events 219 are filtered according to service impact, impacted time duration and affected service area.

A service impact assessment is made on the output events 219 and is used in updating policy 220 in the closed control loop. The policy 220 may be updated automatically by the service impact event analyzer 215, and may be updated in real time after making the service impact assessment. The policy controls cloud resource orchestration 230, which, in turn, oversees the assignment of network resources in the networks 242, 243, 244.

An event 219 is defined as a service impact event if the following two conditions hold: (1) the event function is an application-layer alarm type, and (2) the event severity level is critical or major. The service impact depends on the service systems being considered. For example, a service is impacted in VoLTE/IMS if the call setup (signaling) process cannot be completed or cannot be completed in time (signaling performance requirements).

Figure 3:
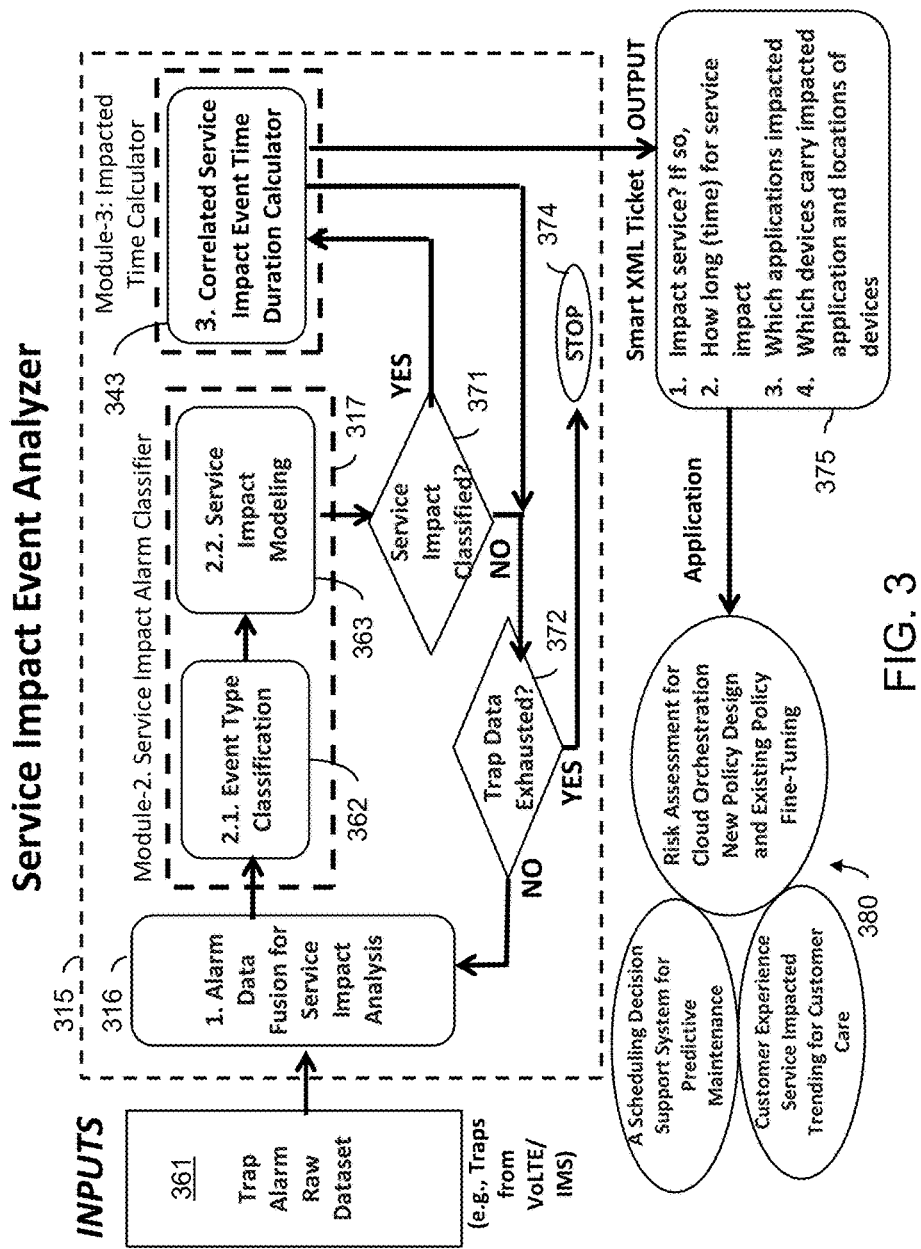
FIG. 3 is a flow chart showing a service impact event analyzer according to embodiments of the present disclosure.

A service impact event analyzer 315 in accordance with the present disclosure, shown in FIG. 3, includes several modules that together process a trap alarm raw dataset 361 and produce an output 375 that may be used in a closed control loop architecture. An alarm data fusion module 316 performs a data fusion operation on the raw dataset 361 to prepare the data for service impact analysis. The alarm data fusion module 316 builds a subset dataset fused from the raw trap dataset that is needed for service impact analysis for a targeted network element or a set of network elements.

The following is an example format of a subset dataset for VoLTE/IMS:
Alarm name
Location/Service Zone (e.g., Chicago VoLTE Service Zone)
Alarm Source
  Device name (e.g., P-CSCF) for physical networks
  IP address (e.g., virtualized P-CSCF) for virtualized networks
Event type (e.g., Processing_Error_Alarm)
On-set time/Clear time (e.g., Onset@Jan 23 09:18:57 2015/Cleared@Jan 23 09:45:44 2015)
Severity (e.g., Critical)
Event Description (related to Probable Causes)
  Maintenance, Software failure, connection failure, utilization threshold exceed, etc.

Both physical and virtualized IMS components have the same application-related alarm data types. The difference of monitored alarm fused data between physical and virtual IMS networks in terms of service impact analysis is that additional VM and Guest OS traps must be observed for virtualized networks. However, the alarm data format, an example of which is shown above, is the same for virtual resource components (i.e. VM-Virtual Machine and Guest OS) and physical resource components.

A service impact alarm classifier module 317 includes event-type classification 362 and service impact modeling 363. In one example, maintenance events are recognized through a "SYS_Configuration" alarm and are then classified as service-impacted events. In an example event detection for root cause and correlation procedure in the service impact alarm classifier module 317, the fused data is first searched for a "SYS_Configuration" alarm on a given network component. For each such alarm found, the clear alarm is identified by matching the alarm ID within the device. Severity level and trap behavior anomaly are checked, and other associated faulty alarms are gathered based on the service impact modeling.

After the service impact event (e.g., "SYS_Configuration") is determined to be classified at decision 371, an impacted time calculator module 343 correlates all secondary alarms and calculates an event time duration for each event. The process continues until the trap data is exhausted, as determined at decision 372, whereupon the process is stopped at 374.

The output 375 of the service impact event analyzer 315 may be instantiated as a smart XML ticket or other formats. The output may include a determination whether the event impacts a service. If so, then the output may further include a duration of the service impact, which applications were impacted, which devices carry impacted applications and the locations of those devices.

The output 375 may be used in various applications 380 used by policy management. For example, the output may be used in risk assessment for cloud orchestration, new policy design and existing policy fine-tuning. The output may also be used in a scheduling decision support system for predictive maintenance, and in a system for customer experience service impacted trending for customer care. In each case, the use of the output 375 may be performed automatically. For example, the service impact event analyzer 315 may automatically initiate policy changes or preventive maintenance scheduling.

Figure 4:
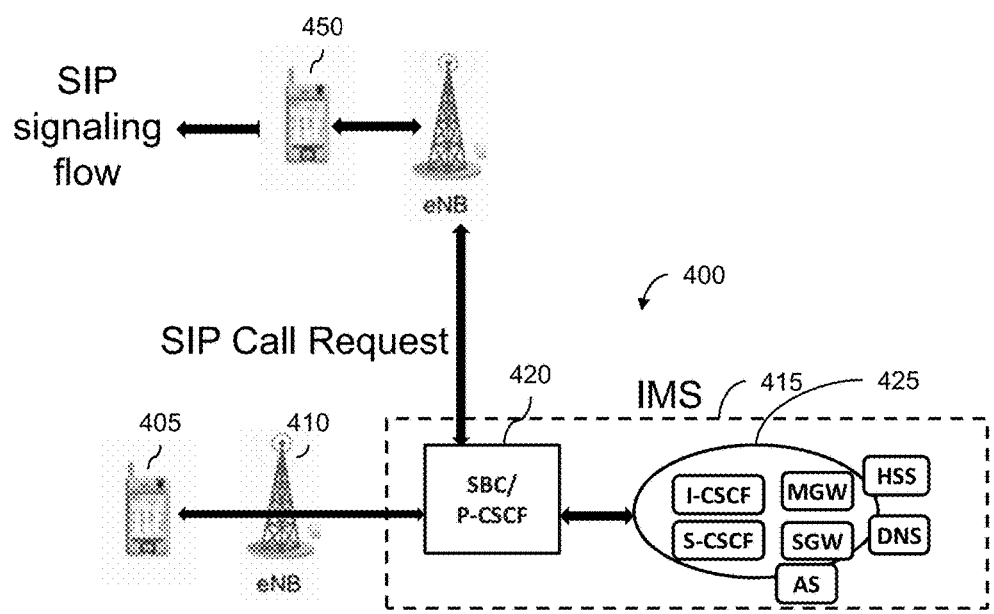
FIG. 4 is a block diagram showing a call setup in a Voice-over-LTE/IP Multimedia Subsystem (VoLTE/IMS) system.

In the use case example 400 shown in FIG. 4, call setup attach points in a VoLTE/IMS network generate alarms. In the VoLTE/IMS call set-up, user equipment (UE) 405 transmits a request via eNodeB cellular base station hardware 410 to a session border controller (SBC) proxy-call session control function (P-CSCF) 420 in an IMS domain 415. The request may be for a service such as voice over IP (VoIP). The request is transmitted via Session Initiation Protocol (SIP) after the UE establishes a radio connection and acquires an IP address from an evolved packet core (EPC) gateway.

P-CSCF 420 may be a physical device or may be a virtualized network element. The SBC/P-CSCF 420 is the single point of contact in the control plane for the IMS UEs 405, 450, and interacts with other elements 425 in the IMS domain 415. The UEs 405, 450 attach to the P-CSCF prior to performing IMS registrations and initiating SIP sessions, including resource and quality of service (QoS) negotiation.

Figure 5:
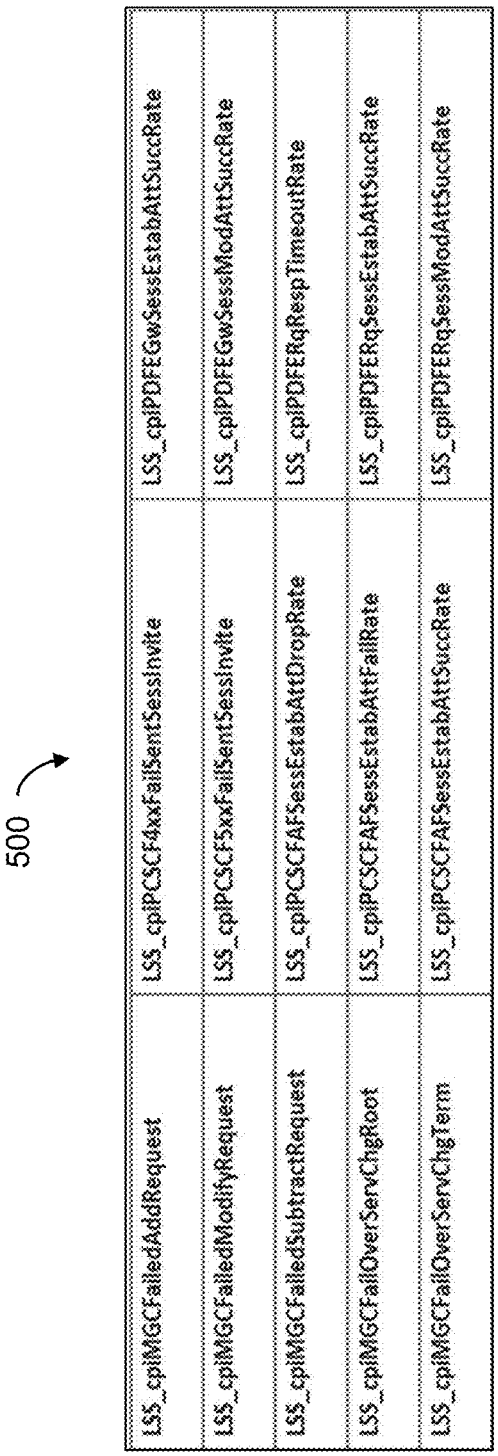
FIG. 5 is a chart showing example alarm traps relating to service impact events in a VoLTE/IMS system.

In the service alarm type classification process, it is determined whether received alarm traps are associated with a service alarm type that would affect services if the element's processing functions fail. Example alarm traps from VoLTE/IMS relating to service impact events are shown in the table 500 of FIG. 5.

More specifically, in the call setup example, an alarm trap is a service alarm type if it is associated with at least one of the following processing function classes: (1) application processing, (2) message processing in the session layer and above (L4+), and (3) application data processing functions. Application processing is the targeted application that the element needs to perform, such as call setup. Message processing is the data packet that is received, interpreted, and communicated with other sources, such as SIP and Diameter messages. Application data processing is the statistics of the processed application for success or failure in a variety of measurements, such as session established attempt success rate.

TABLE 1 shows a classification of a number of trap alarms from a call setup example:

TABLE 1

| Call Setup related Processing Function Class | Trap Classification (VoLTE/IMS Example) |
| --- | --- |
| Application Processing | LSS__cpiMGCFailedAddRequest |
| | LSS__cpiPDFERqRespTimeoutRate |
| | LSS__cpiPCSCF4xxFailSentSessInvite |
| Service (L4+) Message Processing | LSS__sipLinkUnavailable |
| | LSS__diamLinkDown |
| | LSS__remoteQueryServerFailure |
| Appl Data processing | LSS__cpiDropRateAlarm |
| | LSS__asdaRequestQueue |

TABLE 1 shows only some example trap classifications. Those traps come directly from the network element. As analyzed, in the call setup example, there are more than 70 alarm traps for indicating significant service degradation or service connection failure.

If the trap alarm is identified as a service alarm type, the analyzer then checks whether the severity of the alarm is critical or major. Alarms are generally classified into one of the following severity levels: critical, major, minor, warning, information only, which reflects the option of spare protection. In one example, an application processing function generates a "minor" severity in the trap message, even though a connection interfacing with this function is failed, because this function is equipped with at least two connections or links for interfaces. Because the exemplary trap message is classified as having only "minor" severity, it is not considered service impacting.

The service impact alarm classifier module 317 (FIG. 3) then creates a service impact model to examine details of the service impact of each service impact alarm. The model identifies which services are provided by the network component per its design use. The network component can be identified in the extracted trap data by the "device name" field in the alarm format. For example, the network component may be a VoLTE/IMS network element such as P-CSCF.

Each identified service is then analyzed, to determine a major processing area in which a root cause failure would impact the service. A major processing area can be defined as: SIP signaling, Diameter protocol processing, OAM interface, functional process, and so on. For example, if the SIP signaling processing is down, then the VoLTE service is impacted.

In TABLE 2, impacted services for P-CSCF in a VoLTE/IMS system are provided:

TABLE 2

| P-CSCF SERVICE Listing | Processing Area |
| --- | --- |
| PCRF Interface | => Diameter |
| Emergency Call Handing (E911) | => Functional |
| ATCF/ATGW function for eSRVCC | => Functional |
| Transcoding (IPv4 vs IPv6) | => Functional |
| CPM Service (i.e., SMS-Over-IP) | => SIP |
| VoLTE Service | => SIP |
| CVoIP Service | => SIP |
| Softphone Service | => SIP |
| Video IR.94 Service | => SIP |
| CCF Interface | => Diameter |
| Monitoring Interface | => OAM |
| Capacity and Performance Management Interface | => OAM |
| Fault Management Interface | => OAM |

Service impact events reported in the knowledge-based subset dataset and associated with the network component identified above are collected, and those service impact events are categorized by mapping into categories such as PD-FE, BGC, P-CSCF, SIP, Diameter, DNS, QoS, FSDB, etc. The service impact modeling takes an important step of categorizing all service related processing into service event areas, as shown in the exemplary block diagram 800 of FIG. 8. The service event areas are the root cause areas and different for each use case, and vary with network configuration, services offered, etc. In sum, if a service event area has a fault, then certain service impact and alarm traps are rendered.

Figure 6:
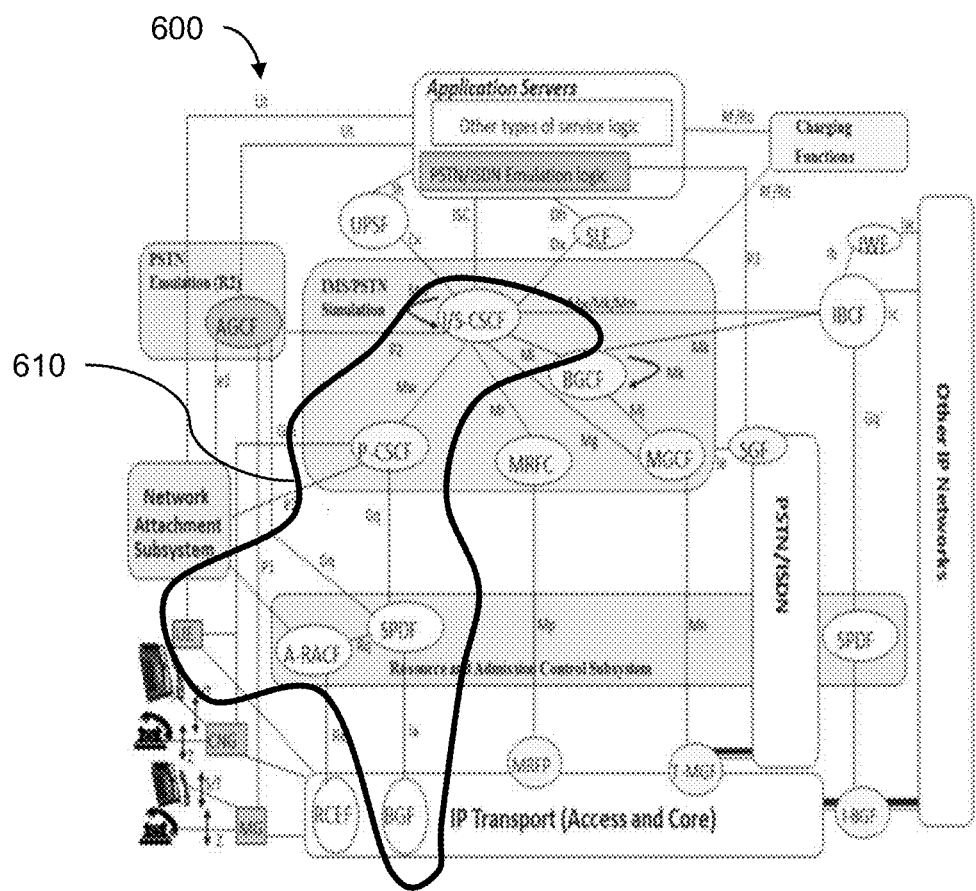
FIG. 6 is a block diagram of an IMS system showing functional areas that a deployed P-CSCF/SBC network element is to perform as determined by embodiments of the present disclosure.

A model is then established for a network element to associate process function class with event categories reported by the traps. The exemplary network diagram 600 of FIG. 6, taken from "TISPAN IMS Reference Architecture" by Rait—Own work, Licensed under CC BY-SA 3.0 via Wikipedia™, is used to illustrate functional areas identified by the model. The boundary 610 identifies functional areas that a deployed P-CSCF/SBC network element is to perform in the network.

TABLE 3 below shows the call setup related processing function class to be performed, along with a set of detailed root cause areas where events will be reported by traps on the impacted services. Note that the identified events in TABLE 3 are at the service level (i.e., Layer 4 and above), not at the Layer 3/2 or physical networking level (Layer 1).

TABLE 3

| Call Setup Related Processing Function Class | Events Reported by Traps |
| --- | --- |
| Application Processing | P-CSCF |
|  | PD-FE |
|  | BGC |
| Service (L4+) Message Processing | SIP |
|  | Diameter |
|  | DNS |
| Appl Data processing | QoS |
|  | FSDB |

The service impact time duration calculator module 343 (FIG. 3) of the presently described service impact event analyzer is then used to determine a cumulative time duration of service impact events reported in the fused dataset and associated with the network component of the service impact modeling.

An event time duration is computed for alarm pairs having the same alarm ID within the same device. The durations are computed as the clear time minus the onset time. Note that the acceptable range of an event time duration is configurable based on operations requirements. For example, the event time duration might be configured to be between 0 and 3660 seconds, or between 0 and 18300 seconds.

Figure 7:
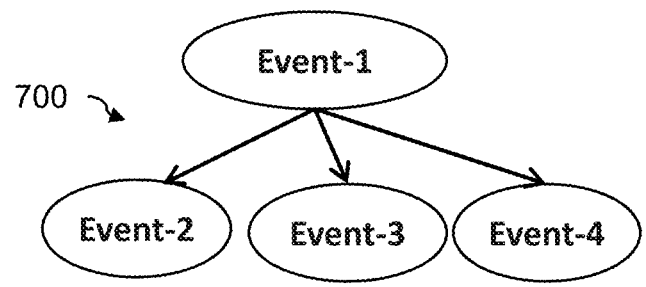
FIG. 7 is a representation of an event dependency graph as determined by embodiments of the present disclosure.

Using the impacted time calculator 343, all secondary alarms associated with a given alarm are correlated via a parent-child alarm dependency graph based on the signaling and user traffic flow of the service system (e.g., IMS). An example parent-child alarm dependency graph 700, shown in FIG. 7, illustrates the dependency of three events on a parent Event-1.

Figure 8:
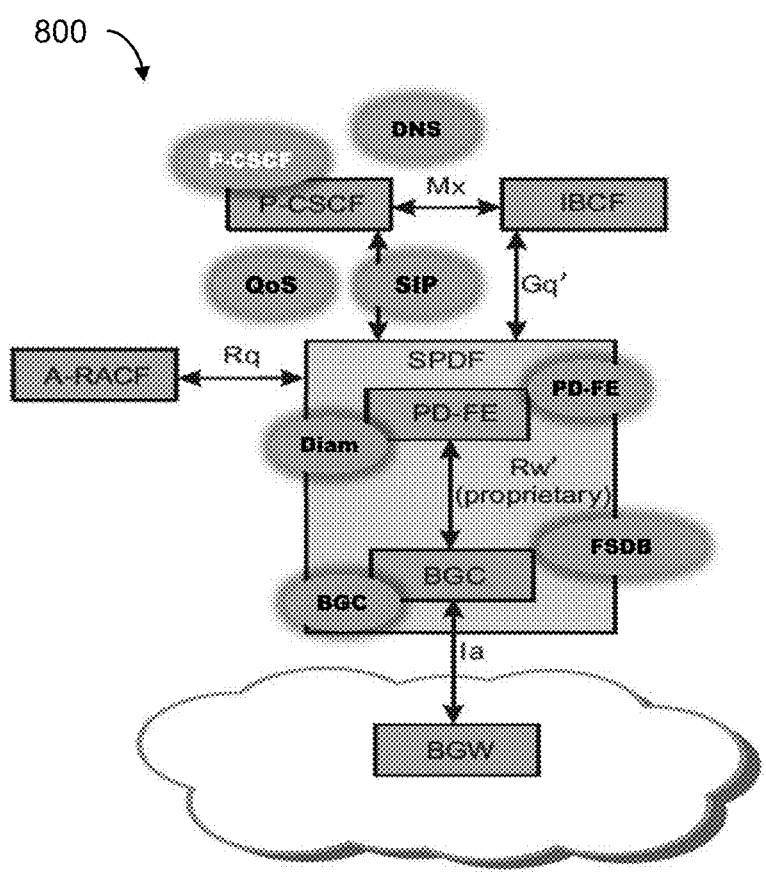
FIG. 8 is a block diagram showing a service impact model used by a service impact event analyzer according to embodiments of the present disclosure.

With a service impact event analyzer such as the analyzer 800 shown in FIG. 8, it is possible to analyze the service impact alarm traps and service impact modeling to find out the root cause of multiple service impact events. In the service impact event analysis, it is often found that other non-service alarm traps were generated. Note that failures of network interfaces between BGW and SBC also cause service impacts. The model, which analyzes the service layer (Layer 4 and above) problem then drills down to the data layer (layer 3/2) and then physical layer (layer 1), provides a solid foundation for examining why there were service impact alarms triggered for a large volume.

Figure 9:
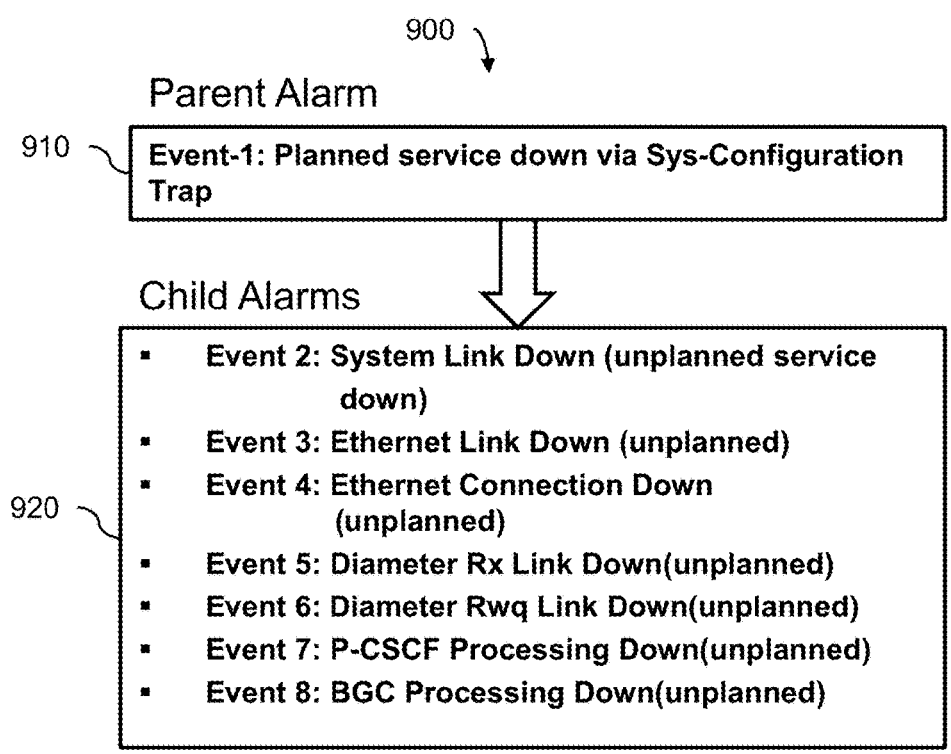
FIG. 9 is a block diagram showing parent-child relationships of alarms as determined by embodiments of the present disclosure.

In an example using VoLTE/IMS, illustrated by the block diagram 900 shown in FIG. 9, Diam LinkDown alarms and SIP LinkDown alarms were analyzed and investigated. It was discovered that there was a parent alarm called "SYS_Configuration" (block 910) that triggered a large number of service impact alarms (block 920). In sum, with a parent alarm event identified together with time duration calculated, it is possible to identify the associated child events, then association rules can be specified for a group of service impact events. So, it can be determined which event is a parent and which other events are children for an association rule. For example, "SYS_Configuration" together with Diam LinkDown alarms and SIP LinkDown alarms are found, the "SYS_Configuration" event can be specified as the parent and others are children. The specified rules can enable the automation of event analysis and locate the root cause among multiple service impact events. The rules can correlate child (secondary) events with the parent (primary) event, while reporting only the service impact root cause (parent event) for trouble resolution.

Figure 10:
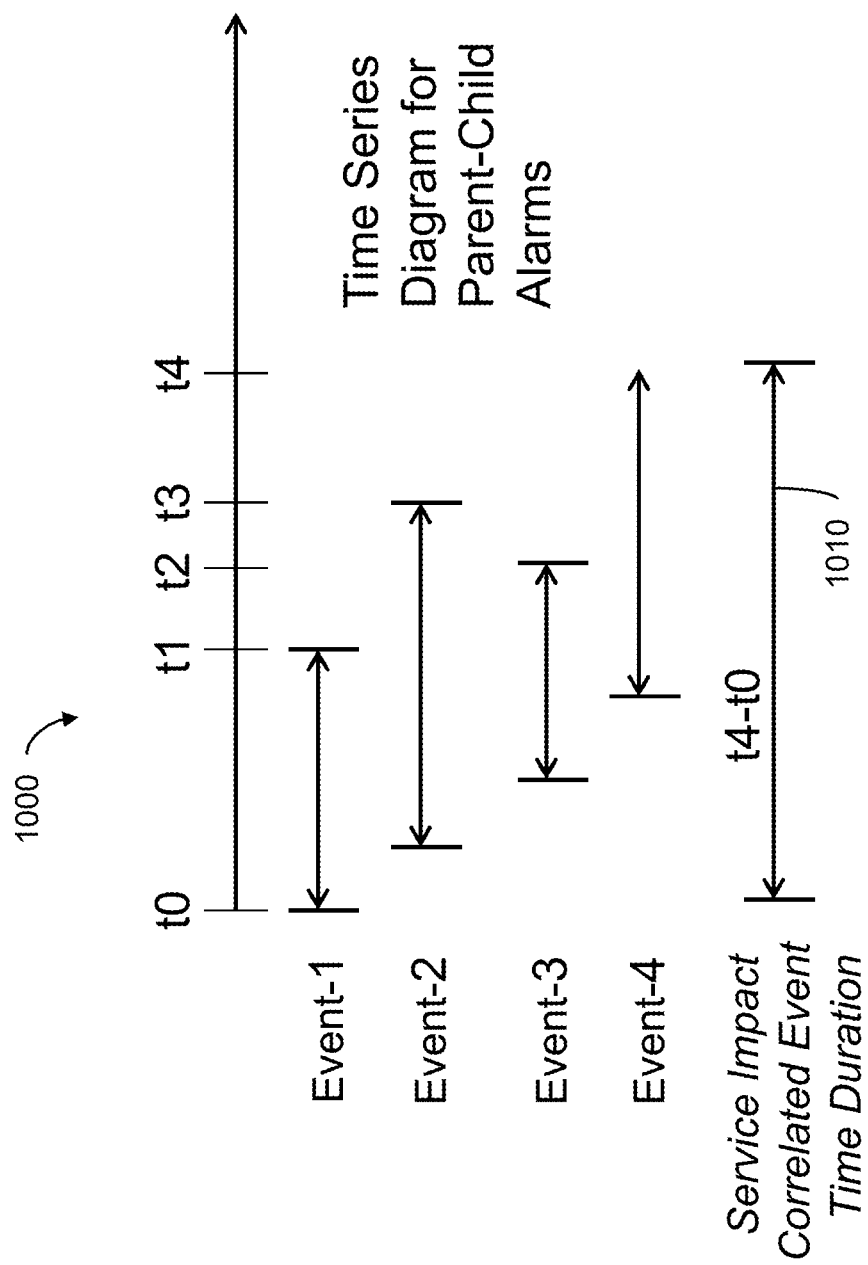
FIG. 10 is a time series diagram for parent-child alarms as determined by embodiments of the present disclosure.

The analyzer then constructs a time series event diagram, such as diagram 1000 shown in FIG. 10, and computes a correlated event time duration 1010 for the subject service alarm. Event-2, Event-3 and Event-4 were found to be child events of the parent Event-1, as illustrated above with reference to FIG. 7. Events are found to be correlated if each is generated due to the parent event and its onset time is within the time interval of the parent event. An event time equals the clear time minus the onset time for an event pair (i.e., onset and clear) having the same [service type, Pool ID, Member ID]. A network function is impacted for not providing full services until the event associated with this network function is cleared.

Service impacted network areas, including service location and device type, may then be identified from the fused dataset, using information from an alarm format such as that discussed above.

The hardware and the various network elements discussed above comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements also includes memory that functions as a data memory that stores data used during execution of programs in the processors, and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A method, comprising:
   identifying service impact events in an alarm dataset from a cloud software defined network, the service impact events including service alarms;
   identifying alarm sources associated with the service impact events;
   identifying impacted network service alarms provided in the cloud software defined network, the impacted network service alarms being identified according to the alarm sources;
   identifying service alarm type classifications for the impacted network service alarms;
   by a processor of a service impact event analyzer, identifying a service impact model comprising the service alarm type classifications and the service impact events, the model describing impacts of the service impact events on network services;
   using the service impact model, identifying association rules of parent and child event relationships of a particular service impact event of the service impact events, so that a parent event is determined to be a primary event for root causes of trouble, and child events are determined to be correlated to the parent event, the parent event comprising a parent event time interval beginning at a parent event onset time and ending at a parent event clear time later than the parent event onset time, each child event comprising a child event time interval beginning at a child event onset time and ending at a child event clear time later than the child event onset time, wherein each child event is determined to be correlated to the parent event only if the child event is generated due to the parent event and the child event onset time is within the parent event time interval;

by the processor, computing a time duration of the particular service impact event by subtracting the parent event onset time from a particular child event clear time of the child events determined to be correlated to the parent event of the particular service impact event; and by the processor, evaluating a risk area and degree of service assurance based on the time duration and on the service alarm type classifications.

2. The method of claim 1, wherein the identifying the particular service impact event in the alarm dataset further comprises identifying one of the service impact events having a severity exceeding a severity threshold.

3. The method of claim 1, further comprising:
receiving a raw trap data set; and
fusing data from the raw trap data set to generate the alarm dataset.

4. The method of claim 1, wherein the alarm dataset comprises, for each of a plurality of alarms, an alarm name, an alarm location, an alarm source, and event type, an onset time, a clear time, a severity and an event description.

5. The method of claim 1, wherein the evaluating the risk area and the degree of service assurance based on the time duration and on the service alarm type classifications further comprises evaluating a cloud orchestration policy based on a severity of the particular service impact event.

6. The method of claim 1, wherein the identifying service alarm type classifications further comprises identifying a predetermined process function class selected from a group consisting of an application processing class, a service messaging processing class and an application data processing class.

7. The method of claim 1, wherein the identifying the alarm sources associated with the service impact events further comprises identifying alarm sources by device names in a physical network.

8. The method of claim 1, wherein the identifying the alarm sources associated with the service impact events further comprises identifying alarm sources by Internet protocol addresses in a virtualized network.

9. The method of claim 1, wherein the identifying the alarm sources associated with the service impact events further comprises identifying a proxy-call session control function in a voice-over-Internet protocol system.

10. The method of claim 1, further comprising:
automatically tuning a cloud orchestration policy of the cloud software defined network based on the risk area and the degree of service assurance.

11. The method of claim 1, further comprising:
automatically scheduling predictive maintenance operations of the cloud software defined network based on the risk area and the degree of service assurance.

12. A service impact event analyzer for evaluating a cloud orchestration policy in a network, comprising a network interface, a processor and a computer-readable storage device having stored thereon computer readable instructions, wherein execution of the computer readable instructions by the processor causes the processor to perform operations comprising:

receiving a raw trap dataset from the network via the network interface;

fusing data from the raw trap data set to extract an alarm dataset;

identifying a service impact event in an alarm dataset, the service impact event including service alarms;

identifying alarm sources associated with the service impact event;

identifying impacted network service alarms provided in the cloud software defined network, the impacted network service alarms being identified according to the alarm sources;

identifying service alarm type classifications for the impacted network service alarms;

identifying a service impact model comprising the service alarm type classifications and the service impact events, the model describing impacts of the service impact events on network services;

using the service impact model, identifying association rules of parent and child event relationships of the service impact event, so that a parent event is determined to be a primary event for root causes of trouble, and child events are determined to be correlated to the parent event, the parent event comprising a parent event time interval beginning at a parent event onset time and ending at a parent event clear time later than the parent event onset time, each child event comprising a child event time interval beginning at a child event onset time and ending at a child event clear time later than the child event onset time, wherein each child event is determined to be correlated to the parent event only if the child event is generated due to the parent event and the child event onset time is within the parent event time interval;

computing a time duration of the service impact event by subtracting the parent event onset time from a particular child event clear time of the child events determined to be correlated to the parent event of the service impact event; and evaluating a risk area and degree of service assurance based on the time duration and on the service alarm type classifications.

13. The service impact event analyzer of claim 12, wherein the identifying the service impact event in the alarm dataset further comprises identifying one of the service impact events having a severity exceeding a severity threshold.

14. The service impact event analyzer of claim 12, wherein the alarm dataset comprises, for each of a plurality of alarms, an alarm name, an alarm location, an alarm source, and event type, an onset time, a clear time, a severity and an event description.

15. The service impact event analyzer of claim 12, wherein the evaluating the risk area and the degree of service assurance based on the time duration and on the service alarm type classifications further comprises evaluating a cloud orchestration policy based on a severity of the service impact event.

16. The service impact event analyzer of claim 12, wherein the identifying service alarm type classifications further comprises identifying a predetermined process function class selected from a group consisting of an application processing class, a service messaging processing class and an application data processing class.

17. The service impact event analyzer of claim 12, wherein the identifying the alarm sources associated with the service impact events further comprises identifying a proxy-call session control function in a voice-over-Internet protocol system.

18. The service impact event analyzer of claim 12, wherein the operations further comprise:

automatically tuning a cloud orchestration policy of the cloud software defined network based on the risk area and the degree of service assurance.

19. The service impact event analyzer of claim 12, wherein the operations further comprise:

automatically scheduling predictive maintenance operations of the cloud software defined network based on the risk area and the degree of service assurance.

20. A computer-readable storage device having stored thereon computer readable instructions for evaluating a cloud orchestration policy in a network, wherein execution of the computer readable instructions by a processor causes the processor to perform operations comprising:

identifying service impact events in an alarm dataset from a cloud software defined network, the service impact events including service alarms;

identifying alarm sources associated with the service impact events;

identifying impacted network service alarms provided in the cloud software defined network, the impacted network service alarms being identified according to the alarm sources;

identifying service alarm type classifications for the impacted network service alarms;

identifying a service impact model comprising the service alarm type classifications and the service impact events, the model describing impacts of the service impact events on network services;

using the service impact model, identifying association rules of parent and child event relationships of a particular service impact event of the service impact events, so that a parent event is determined to be a primary event for root causes of trouble, and child events are determined to be correlated to the parent event, the parent event comprising a parent event time interval beginning at a parent event onset time and ending at a parent event clear time later than the parent event onset time, each child event comprising a child event time interval beginning at a child event onset time and ending at a child event clear time later than the child event onset time, wherein each child event is determined to be correlated to the parent event only if the child event is generated due to the parent event and the child event onset time is within the parent event time interval;

computing a time duration of the particular service impact event by subtracting the parent event onset time from a particular child event clear time of the child events determined to be correlated to the parent event of the particular service impact event; and evaluating a risk area and degree of service assurance based on the time duration and on the service alarm type classifications.

* * * * *